UNITED STATES PATENT OFFICE.

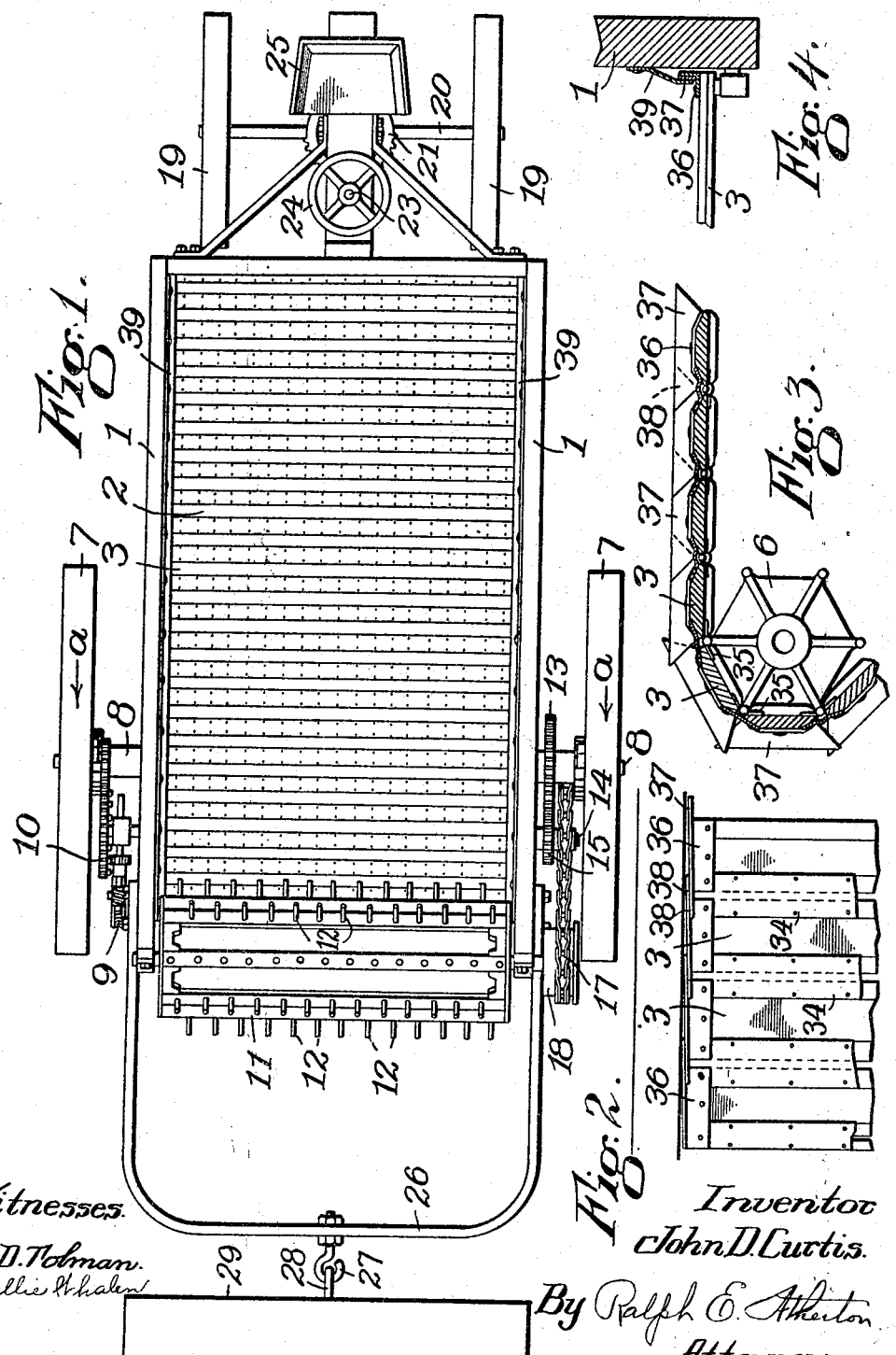

JOHN D. CURTIS, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

CONVEYER FOR A SAND-SPREADER.

1,211,294.  Specification of Letters Patent.  Patented Jan. 2, 1917.

Application filed August 29, 1912. Serial No. 717,713.

*To all whom it may concern:*

Be it known that I, JOHN D. CURTIS, a citizen of the United States, residing at Worcester, in the county of Worcester and Commonwealth of Massachusetts, have invented a new and useful Improvement in a Conveyer for a Sand-Spreader, of which the following is a specification, accompanied by drawings forming a part of the same.

The object of my present invention is to provide a conveyer for an apparatus adapted to be used in road construction for the purpose of spreading a coating of sand uniformly upon the oiled surface of a highway in advance of the supporting wheels of the spreader. I accomplish this result by the construction and arrangement of parts as hereinafter described, the novel features being pointed out in the annexed claim.

Referring to the accompanying drawings, Figure 1 is a plan view of the machine as shown in side view in Fig. 1. Fig. 2 is a plan view on a larger scale of a portion of the movable bottom. Fig. 3 is a sectional view of a portion of the movable bottom, and Fig. 4 is a detail view of the movable bottom.

Similar reference characters refer to similar parts in the different figures.

Referring to the drawings, 1, 1 denote the sides of the body portion of the spreader which is adapted to contain a load of sand. The body is provided with a movable bottom 2 consisting of slats 3 extending transversely across the body and attached at their ends to the links of endless chains 4, which are supported upon sprocket wheels 5 at the rear end of the body and upon similar sprocket wheels 6 at the forward end of the body. The body is supported near its forward end upon a pair of driving wheels 7, 7, each of said driving wheels having a pawl and ratchet connection with an axle 8 upon which they are mounted, by which a rotary motion is imparted to the axle 8 when the driving wheels are rotating in the direction of the arrows *a*, Fig. 1. The shaft of the sprocket wheel 6 is provided with a worm gear 9 which is slowly rotated from the axle 8 by a geared connection such, for example, as that shown at 10, Fig. 1, but forming no part of my present invention.

Mounted in suitable bearings in the forward end of the body is a rotating cylinder or beater 11 containing the radial teeth 12, 12. The beater 11 is rapidly rotated in the direction of the arrow *b* from the axle 8 by means of a gear 13 on the axle 8, which drives an intermediate shaft 14 by means of a pinion 15. The shaft 14 carries a sprocket wheel 16 connected by a chain belt 17 with a sprocket wheel 18 journaled concentrically with the shaft of the beater 11 and connected with the beater by means of an intermediate planetary gear, not shown, by which the rotation of the sprocket wheel 18 is reversed, so that the rotation of the driving wheel 7 in the direction of the arrow *a* will rotate the beater in the direction of the arrow *b*.

The rear end of the body is supported upon wheels 19, 19 carried upon an axle 20, which has a swiveled connection with the body and is provided with a horizontal segmental gear 21 engaged by a pinion 22 attached to the lower end of a steering post 23, provided at its upper end with a hand wheel 24 in convenient position to an operator's seat 25. The forward end of the body is provided with a bail 26 having a hook 27 engaging an eyebolt 28 at the rear end of an oil tank 29, having means for the distribution of oil over the surface of a roadway through a series of pipes 30.

In order to cause the load of sand contained in the body of the spreader to be slowly moved toward the revolving beater 11, I cover the openings between each of the slats 3, 3 by strips of canvas 34, 34, Fig. 2, attached to the upper sides of the slats 3, 3. I also cover each of the openings between the slats 3, 3 by strips of canvas 35 attached to the under sides of the slats. The canvas strips 34 prevent sand from working into the openings between the slats 3, 3 from the upper side, while the canvas strips 35 prevent the access of sand between the slats as the latter pass over the sprocket wheels 6 which brings the under sides of the slats uppermost. At each end of the slats 3, 3 I also attach strips 36, preferably of leather, each of said strips 36 having a flange 37 turned upwardly and parallel with the sides 1 of the spreader body. The flanges 37 have tapered ends by which the upper edges of the flanges are made the widest, said tapered ends overlapping as shown at 38, Figs. 2 and 3. Attached to each of the sides 1 is a continuous strip of leather 39 forming an apron, hanging downward and overlapping the flanges 37 and breaking joints with the flanges to prevent the access of sand between the ends of the slats 3 and the sides 1.

In some particulars of construction and operation my improved sand spreader corresponds with the construction and operation of that class of farm implements known as manure spreaders, but my improved sand spreader differs from the manure spreaders now in use in having means for traction applied to the end containing the beater, causing the spreader to run backwardly as compared with the movement of a manure spreader. The intermediate driving mechanism between the driving wheels 7 and the beater is arranged, however, to rotate the beater in the same direction as the beater of a manure spreader, notwithstanding the reverse movement of the spreader. This is accomplished by the use of the intermediate shaft 14 which is geared directly to the axle 8 and from which the beater 11 is driven.

The sand spreader embodying my present invention is also provided with means at its rear end for the guidance of the spreader by means of the swiveled rear axle 20 and the steering mechanism adapted to be operated by an attendant from the seat 25. Means are also provided in connection with the movable bottom for closing all openings and joints between the stationary and movable parts to prevent the access of sand, which is accomplished, in the present instance, by means of the canvas strips 34 and 35 and by means of the flanged strips 36 and depending aprons 39.

I claim,

In a sand spreader, a body, a movable bottom, comprising a series of rigid transverse slats having hinged connections, flexible coverings for the openings between the slats, flexible flanges carried by the opposite ends of said slats, overlapping each other and the sides of the body, said flanges being of greater width at their free ends than the said slats, and a depending apron attached to the body and overlapping said flexible flanges.

Dated this 22nd day of August, 1912.

JOHN D. CURTIS.

Witnesses:
PENELOPE COMBERBACH,
NELLIE WHALEN.